(12) United States Patent
Farges

(10) Patent No.: US 10,946,835 B2
(45) Date of Patent: Mar. 16, 2021

(54) METHOD FOR CONTROLLING ACCESS TO A VEHICLE ACCORDING TO DIFFERENT STRATEGIES

(71) Applicant: Dura Operating, LLC, Auburn Hills, MI (US)

(72) Inventor: Thomas Farges, Gometz le Chatel (FR)

(73) Assignee: DURA Operating, LLC, Auburn Hills, MI (US)

( * ) Notice: Subject to any disclaimer, the term of this patent is extended or adjusted under 35 U.S.C. 154(b) by 0 days.

(21) Appl. No.: 16/184,096

(22) Filed: Nov. 8, 2018

(65) Prior Publication Data

US 2019/0152440 A1 May 23, 2019

(30) Foreign Application Priority Data

Nov. 17, 2017 (EP) ..................... 17202206

(51) Int. Cl.
  *B60R 25/23* (2013.01)
  *B60R 25/24* (2013.01)
  *E05B 81/76* (2014.01)

(52) U.S. Cl.
  CPC ............ *B60R 25/246* (2013.01); *B60R 25/23* (2013.01); *E05B 81/76* (2013.01)

(58) Field of Classification Search
  CPC .................................................. B60R 25/246
  USPC ................................................ 340/5.6, 5.61
  See application file for complete search history.

(56) References Cited

U.S. PATENT DOCUMENTS

| 8,400,303 B2 * | 3/2013 | Oya ....................... B60R 25/00 340/426.14 |
| 2016/0247339 A1 * | 8/2016 | Miller ..................... B60R 25/24 |
| 2017/0072907 A1 * | 3/2017 | Pribisic .............. B60R 25/2045 |
| 2017/0103592 A1 * | 4/2017 | Buttolo ............. G07C 9/00015 |

FOREIGN PATENT DOCUMENTS

| EP | 0735219 | 10/1996 |
| EP | 1218228 A1 | 7/2002 |
| WO | WO2017103644 A1 | 6/2017 |

OTHER PUBLICATIONS

EP Extended Search Report for EP Application No. 17202206.3 dated Apr. 18, 2018, (4 pages).

* cited by examiner

*Primary Examiner* — Qutbuddin Ghulamali

(57) ABSTRACT

A method for controlling access to a vehicle, the vehicle being equipped with an access module and a keypad, an user having a portable device configured to communicate with said access module, the access module being designed to determine a relative position of the portable device with respect to the vehicle, the keypad being positioned outside the vehicle, wherein when the access module detects that the portable device is inside the vehicle and is in an inactive state, wherein said portable device is unable to authorize user access to the vehicle and start of the vehicle, then vehicle unlocking is authorized by a multiple switch operation in a predetermined sequence on the keypad, and wherein after vehicle unlocking, the access module puts the portable device in an active state, wherein said portable device is able to authorize user access to the vehicle.

10 Claims, 4 Drawing Sheets

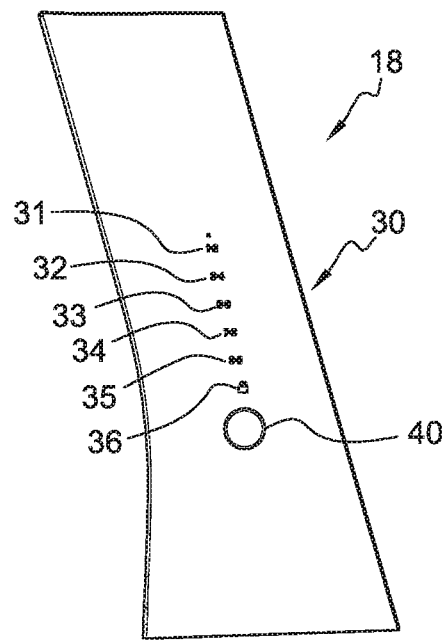
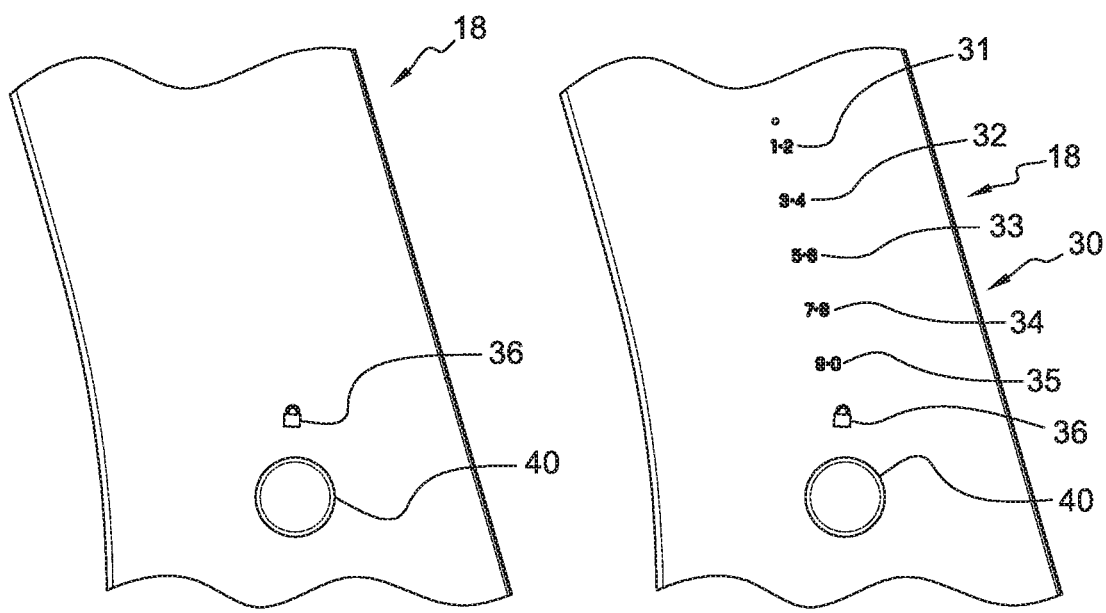
Fig. 1    Fig. 2    Fig. 3

METHOD FOR CONTROLLING ACCESS TO A VEHICLE ACCORDING TO DIFFERENT STRATEGIES

CROSS REFERENCE TO RELATED APPLICATIONS

This application claims priority to European Patent Application No.: EP17202206.3 filed Nov. 17, 2017.

TECHNICAL FIELD

The disclosure concerns a method for controlling access to a vehicle according to different strategies.

BACKGROUND

Several systems and methods are known to provide access to a vehicle.

Classically, a vehicle comprises at least one door provided with a lock. The driver inserts a key into the lock to unlock it, open the door and enter the vehicle.

Alternately or additionally, a vehicle can be provided with a keyless entry system to offer a user more convenient access to the vehicle.

EP 0 735 219 discloses an example of such a keyless entry system, including a mobile device portable by the driver and communicating wirelessly with a vehicle. This solution is more convenient for the driver, as it offers a hands-free access to the vehicle. However, it is not truly keyless, as the user still needs to have a specific object with him every time he needs to access the vehicle.

Another known solution is the use of a keypad equipping the vehicle. In order to access the vehicle, a user needs just to know a passcode. Although keyless, this solution is not hands-free. Therefore combining two solutions may be desirable.

EP 1 218 228 discloses an access method and system, comprising a vehicle equipped with a keypad and a wireless keyless entry device, such as a key-fob. When a user has a wireless keyless entry device, he can access the vehicle by a single keypad switch activation. When a user approaches the vehicle without the wireless keyless entry device, he can still access the vehicle by introducing an access code via vehicle keypad.

US 2017/0103592 discloses a digital token based vehicle access method. Digital tokens are single-use, they are generated by a computer and stored in a personal device, such as a smartphone. In order to grant first-time access to the vehicle, the document discloses that the user can use a key-fob or enter a passcode into a vehicle keypad.

However, these solutions may not fully respond to users expectations, in particular with high-end vehicles. Therefore, a need exists to propose an improved access method.

SUMMARY

The aim of the disclosure is to provide an improved method for controlling access to a vehicle.

To this end, the disclosure concerns a method for controlling access to a vehicle. The vehicle is equipped with an access module and a keypad. An user of the vehicle has a portable device configured to communicate with the access module, the access module being designed to determine a relative position of the portable device with respect to the vehicle. The keypad is positioned outside the vehicle.

According to the disclosure, when the access module detects that the portable device is inside the vehicle and is in an inactive state, wherein said portable device is unable to authorize user access to the vehicle and start of the vehicle, then vehicle unlocking is authorized by a multiple switch operation in a predetermined sequence on the keypad. Furthermore, after vehicle unlocking, the access module puts the portable device in an active state, wherein said portable device is able to authorize user access to the vehicle.

Thanks to the disclosure, access to the vehicle can be provided in a safe manner, while offering a user more flexibility.

According to further aspects of the invention which are advantageous but not compulsory, such a method may incorporate one or several of the following features:

In the active state, the portable device is able to authorize start of the vehicle.

When the access module detects that the portable device is inside the vehicle and is in the active state, then vehicle locking is authorized by a multiple switch operation in a predetermined sequence on the keypad, and after vehicle locking, the access module puts the portable device in the inactive state.

When the portable device is detected inside the vehicle and in the active state, vehicle locking is authorized by a multiple switch operation in a predetermined sequence, then a lock/unlock switch activation, on the keypad.

After completion of the predetermined sequence, the lock/unlock switch of the keypad emits a light signal.

When the portable device is detected outside of the vehicle and in the active state, vehicle unlocking is authorized by a single lock/unlock switch activation on the keypad.

When the portable device is not detected outside or inside of the vehicle, vehicle unlocking is authorized by a multiple switch operation in a predetermined sequence on the keypad.

The keypad becomes visible by activation of a toggle button located near the keypad.

The toggle button is red when the vehicle is locked and green when the vehicle is unlocked.

When the user performs a multiple switch operation on the keypad for locking the vehicle, a lock/unlock switch of the keypad turns green upon successful completion of the predetermined sequence, while numbers of the keypad flash intermittently upon failed completion of the predetermined sequence.

DESCRIPTION OF THE DRAWINGS

The invention will now be explained in correspondence with the annexed figures, and as an illustrative example, without restricting the object of the invention. In the annexed figures:

FIG. 1 is a front view of a vehicle capping equipped with a keypad, for implementing the access method;

FIG. 2 is a view at a larger scale of the keypad of FIG. 1, with masked numerical keys;

FIG. 3 is a view similar to FIG. 3, with visible numerical keys;

DETAILED DESCRIPTION

Figure 4:
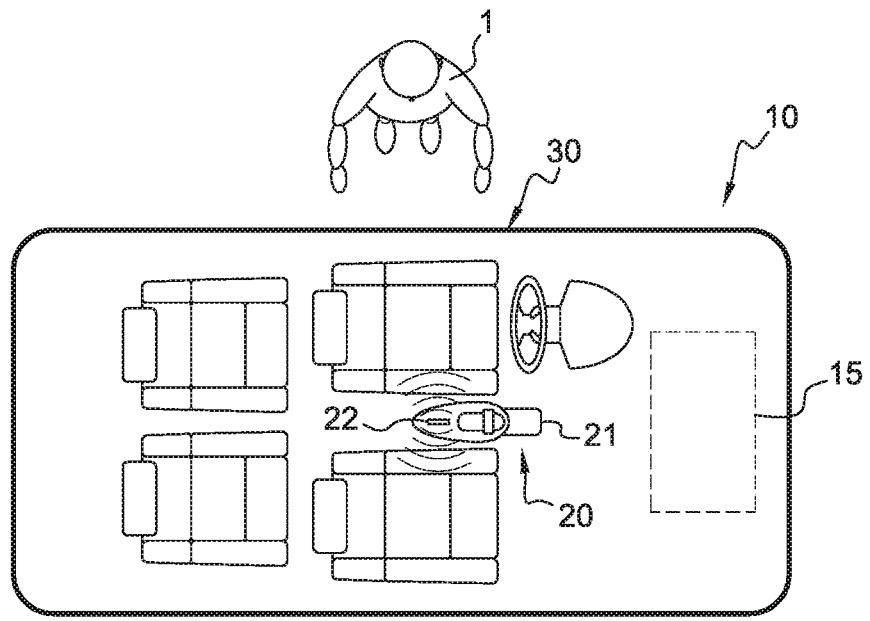
FIG. 4 is a schematic upper view of a vehicle equipped with the keypad of FIGS. 1 to 3, with a user approaching the vehicle, in the case of a first access strategy to the vehicle.

FIGS. 1 to 8 show an automotive vehicle 10 equipped with an access module 20 and a keypad 30, for implementing the access method according to the disclosure.

Vehicle 10 comprises a central electronic control unit, which controls different functions of vehicle 10, such as starting its motor 15.

Module 20 comprises an electronic control unit 21 and an antenna arrangement 22. Module 20 controls several functions of vehicle 10, including unlocking and locking openings of vehicle 10, such as its doors and trunk.

Unit 21 may be integrated to the central electronic control unit of vehicle 10, as a single embarked electronic device. Alternatively, unit 21 may be separate and located away from the central electronic control unit of vehicle 10, communicating via a connection such as CAN bus.

Antenna arrangement 22 is represented by a single beacon for simplification purpose.

A user 1 of vehicle 10 is equipped with a portable personal electronic device 2. Portable device 2 comprises a transceiver able to communicate wirelessly with access module 20 via antenna arrangement 22. Portable device 2 can be a smart card, a key-fob, a smartphone, a tablet or other similar and known portable device 2.

Unit 21 of module 20 comprises a memory containing a list of all devices that are able to authorize access to vehicle 10. For example, vehicle 10 may be associated with two key-fobs, including a first key-fob used by the owner and primary user of vehicle 10, and a second key-fob used by a secondary user, such as a family member or a friend.

According to the disclosure, portable device 2 can be in an inactive state S0 or an active S1.

In the active state S1, device 2 is able to communicate with module 20 and send a valid lock or unlock command.

In the inactive state S0, device 2 is unable to grant access to the vehicle 10 and unable to start vehicle 10. To achieve this, its transceiver may be deactivated. Alternatively, it may not send a command that is authenticated.

Module 20 controls whether device 2 is in inactive state S0 or active state S1.

According to a further embodiment, device 2 may be always able to transmit a command, but under certain conditions, described below, module 20 will not execute such command. For example, module 20, using the above-mentioned list of all devices, classifies each one as active or inactive based on the criteria specified below. Therefore active state S1 or inactive state S0 shall be interpreted broadly as the ability of device 2 to grant or not grant access to vehicle 10, and not only as a particular mode of functioning of device 2.

According to another embodiment, in active state S1, device 2 is able to authorize the start of vehicle 10. For example, starting vehicle 10 consists in activating its motor 15, by igniting an internal combustion engine or connecting an electrical motor with its power supply.

Module 20 is able to determine a relative position of device 2 with respect to vehicle 10, in order to determine whether the portable device 2 is inside or outside of vehicle 10, thanks to antenna arrangement 22 and unit 21.

Different techniques can be used, such as measurement of the signal strength RX or of the relative signal strength RSSI (Received Signal Strength Indication), or triangulation using the plurality of antennas.

Keypad 30 is integrated to a capping 18, or another external trim component of vehicle 10.

Keypad 30 includes six capacitive keys 31, 32, 33, 34, 35 and 36 connected to the access module 20. Keypad 30 may comprise an electronic card formed by a printed circuit board, provided with electronic elements including a processor. Keys 31-35 are numeric keys, while key 36 is a lock/unlock key. The electric connection between keys 31-36 and module 20 is done via printed tracks, connectors, CAN bus or similar.

Keypad 30 has a tactile function, known per se. It is configured to send to module 20 a lock or unlock command of at least one opening of vehicle 10, such as its doors and trunk.

According to the disclosure, keypad 30 is configured to work in two distinctive modes of operation, which are described here-below.

In the first mode, keypad 30 sends a lock or unlock command only if user 1 enters a correct passcode using keys 31-35, then confirms the passcode by pressing the lock/unlock key 36. In a known manner, the passcode is understood as a predetermined sequence of keys 31-35 activation.

In the second mode, keypad 30 sends a lock or unlock command when user 1 just presses the lock/unlock key 36.

Choice of the mode in which keypad 30 is operating is determined by module 20 and will be described in further details below.

Figure 5:
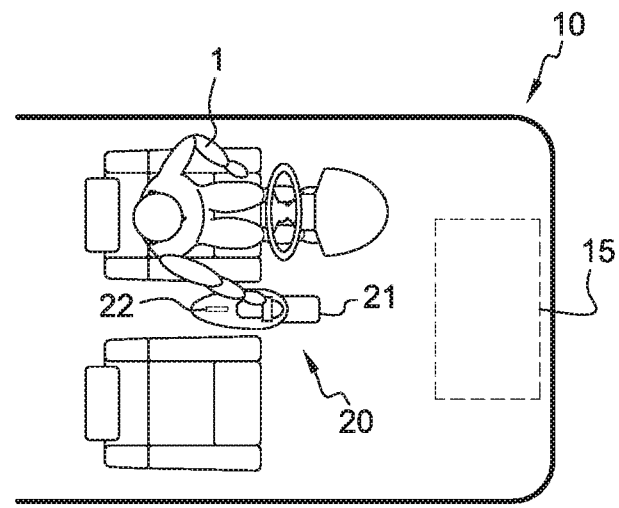
FIG. 5 is a schematic view similar to FIG. 4, with the user installed inside the vehicle.

FIGS. 4 and 5 show a first access strategy to a vehicle 10 by user 1.

In FIG. 4, user 1 is outside vehicle 10 and has no portable device 2 for accessing vehicle 10, such as a smart card, a key-fob or a smartphone.

Therefore, module 20 does not detect any device 2 and switches keypad 30 into the first mode. If user 1 enters the correct passcode, module 20 will grant access to vehicle 10 by unlocking at least one of the openings. Otherwise vehicle 10 remains locked to prevent unauthorized access.

According to a further embodiment, when user 1 touches the toggle button 40, all keys 31-36 of keypad 30 will be illuminated. When user 1 enters a correct passcode, the lock/unlock key 36 turns green, while if the passcode is not correct, keys 31-35 may flash intermittently. Toggle button 40 may include a symbol, such as the manufacturer logo of vehicle 10, and may be also be illuminated after pressing it.

In FIG. 5, user 1 accessed vehicle 10 and is seated inside it.

User 1 can command a start of vehicle 10. He may command it using a physical key and by putting it into the ignition slot, or by pushing a button located on the dashboard. According to a particular embodiment, additional authorization may be required before user can command a start. It may be recognition of the biometric parameters of user 1, such as fingerprint, by a reader connected to module 20, operating switches on the dashboard in a predetermined sequence, or putting a smart card inside a card-reader. Other possibilities are clear for one of ordinary skills in the art.

Figure 6:
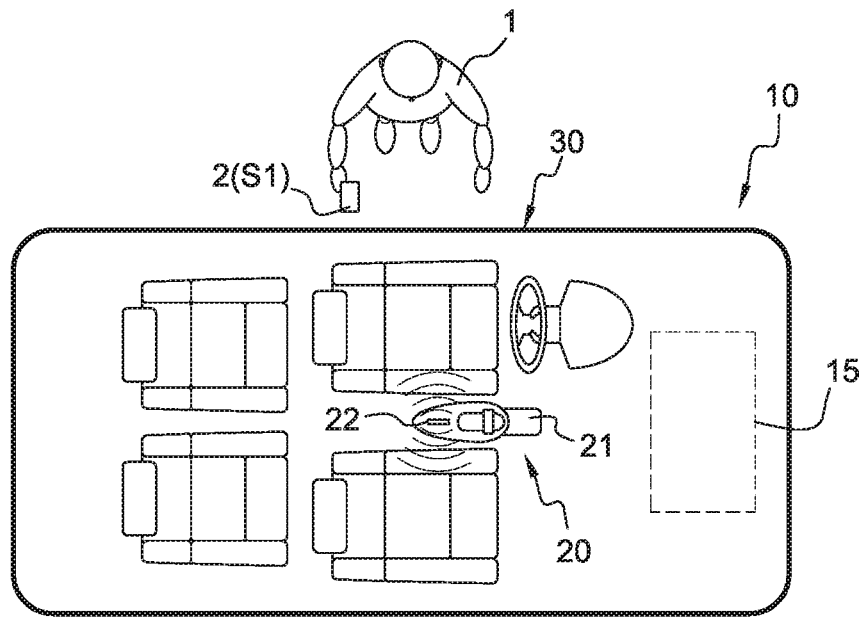
FIGS. 6 and 7 are views similar to FIGS. 4 and 5 respectively, in the case of a second access strategy.
Figure 7:
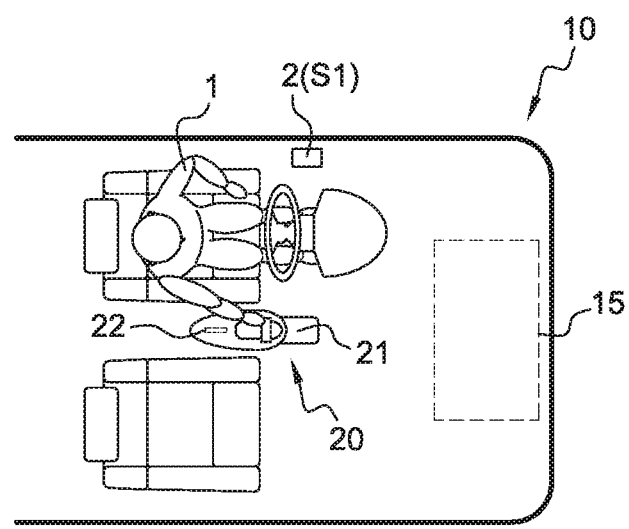

FIGS. 6 and 7 show a second access strategy to vehicle 10 by user 1.

User 1 has with him a portable device 2 that is in active state S1. Module 20 detects that device 2 is located outside vehicle 10. Module 20 switches keypad 30 into the second mode. To gain access to vehicle 10, user 1 just needs to press the lock/unlock key 36.

According to a further embodiment, when module 20 detects device 2, it illuminates just the toggle switch 40 and lock/unlock button 36, while keys 31-35 are not illuminated.

According to another embodiment, keypad 30 is covered with an opaque layer such that while keys are not illuminated they are not visible from the outside of the vehicle 10, as illustrated in FIG. 2.

After accessing vehicle 10, user 1 can command the start of vehicle 10 in the same manner as described here-above in case of a first access strategy. Further to the option described before, in this second strategy, authorization required to command a start can be provided by the same portable device 2 that grants access to vehicle 10. In other words, this strategy corresponds to a hands-free entry method.

Figure 8:
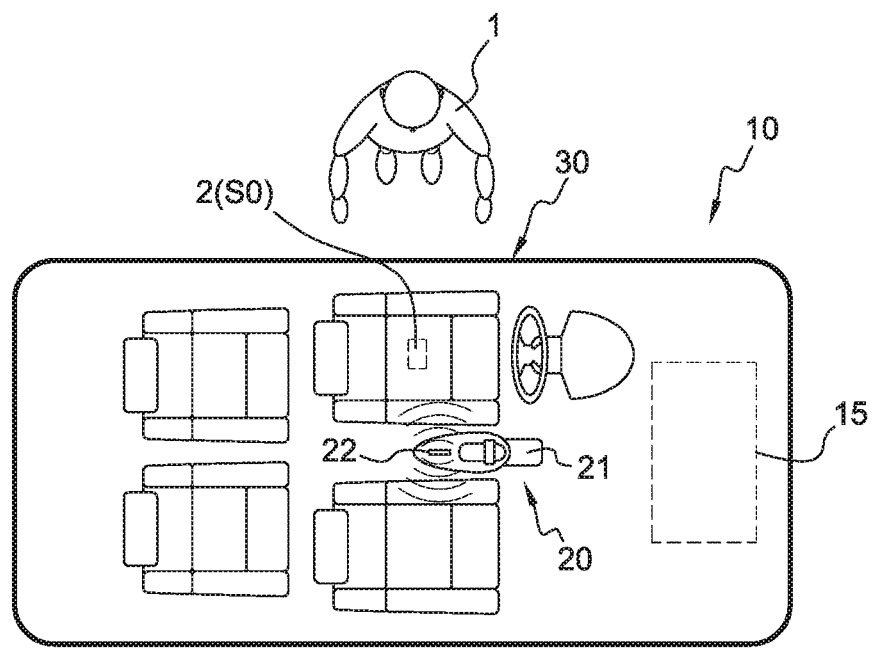
FIGS. 8 and 9 are views similar to FIGS. 4 and 5 respectively, in the case of a third access strategy.
Figure 9:
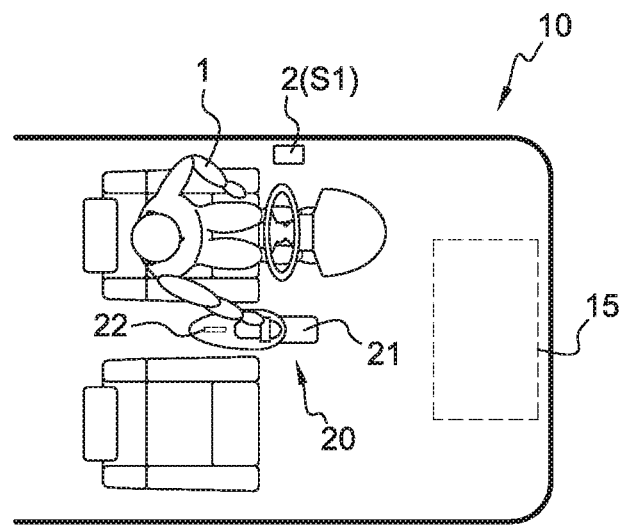

FIGS. 8 and 9 show a third access strategy to vehicle 10 by user 1.

In this third strategy, user 1 can leave the portable device 2 inside vehicle 10. Module 20 determines that device 2 is inside vehicle 10. In order to lock vehicle 10, user 1 needs to enter a passcode. When the passcode is entered, module 20 locks vehicle 10 and puts device 2 in the inactive state S0. Therefore device 2 is unable to authorize access to vehicle 10 and unable to start engine 15 of vehicle 10. Therefore, even if someone gains unauthorized access to vehicle 10, for example by breaking a window, he cannot start vehicle 10 to steal it.

If user 1 approaches again vehicle 10, the situation corresponds to the first access strategy. This means that user 1 may access vehicle 10 by entering a passcode on keypad 30, as described above.

However, according to this third access strategy, module 20 detects that portable device 2 is inside vehicle 10 in inactive state S0. After entering the correct passcode, device 2 is put again into the active state S1.

Therefore, device 2 is able to authorize the start of vehicle 10 again. User 1 can then command the start by simply pressing a button on the dashboard.

Furthermore, if user 1 leaves vehicle 10 with the portable device 2 in active state S1, next time he approaches vehicle 10, the second access strategy will apply. Hence access will be granted just by pressing the lock/unlock key 36.

This third strategy is particularly useful during a sport or leisure activity of user 1. For example, user 1 going for a run or to the beach can leave a key-fob constituting device 2 safely in vehicle 10. Vehicle 10 is locked, and even if someone gains an illicit access, vehicle 10 cannot be started.

Another area where this disclosure is of particular use is a car-sharing situation. This means that one car is used by many users, often with no relationship between them, as opposed to the family. For example it may concern a rental car. At the end of a rental period, first user leaves a key-fob 2 in the vehicle 10 and locks it with a passcode. Key-fob 2 is then deactivated. Second user starts his rental period and approaches vehicle 10. He opens it using the passcode entered on keypad 30, said passcode being received for example from a rental agent, or by SMS or other means. Key-fob 2 is activated and during his rental period, the second user does not need to use the passcode again. At the end of his rental period, the second user leaves the key-fob 2 inside vehicle 10 and locks it with the passcode. Then the whole cycle can repeat for a third user and so on.

Technical features of the different embodiments can be, in whole or part, combined with each other. Thus, the method can be adapted to the specific requirements of the application.

The invention claimed is:

1. A method for controlling access to a vehicle, the vehicle being equipped with an access module and a keypad, a user having a portable device configured to communicate with said access module, the access module being designed to determine a relative position of the portable device with respect to the vehicle, the keypad being positioned outside the vehicle,
wherein when the access module detects that the portable device is inside the vehicle and is in an inactive state, wherein said portable device is unable to authorize user access to the vehicle and start of the vehicle, then vehicle unlocking is authorized by a multiple switch operation in a predetermined sequence on the keypad,
and wherein after the vehicle unlocking, the access module puts the portable device in an active state, wherein said portable device is able to authorize the user access to the vehicle.

2. The method according to claim 1, wherein in the active state, the portable device is able to authorize start of the vehicle.

3. The method according to claim 1, wherein when the access module detects that the portable device is inside the vehicle and is in the active state, then vehicle locking is authorized by the multiple switch operation in the predetermined sequence on the keypad, and wherein after the vehicle locking, the access module puts the portable device in the inactive state.

4. The method according to claim 3, wherein when the portable device is detected inside the vehicle and in the active state, the vehicle locking is authorized by the multiple switch operation in the predetermined sequence, then a lock/unlock switch activation, on the keypad.

5. The method according to claim 4, wherein after completion of the predetermined sequence, the lock/unlock switch of the keypad emits a light signal.

6. The method according to claim 1, wherein when the portable device is detected outside of the vehicle and in the active state, the vehicle unlocking is authorized by a single lock/unlock switch activation on the keypad.

7. The method according to claim 1, wherein when the portable device is not detected outside or inside of the vehicle, the vehicle unlocking is authorized by the multiple switch operation in the predetermined sequence on the keypad.

8. The method according to claim 1, wherein the keypad becomes visible by activation of a toggle button located near the keypad.

9. The method according to claim 8, wherein the toggle button turns red when the vehicle is locked and turns green when the vehicle is unlocked.

10. The method according to claim 1, wherein when the user performs a multiple switch operation on the keypad for locking the vehicle, the lock/unlock switch of the keypad turns green upon successful completion of the predetermined sequence, while numbers of the keypad flash intermittently upon failed completion of the predetermined sequence.

* * * * *